United States Patent
Galbi et al.

(10) Patent No.: US 6,822,959 B2
(45) Date of Patent: Nov. 23, 2004

(54) ENHANCING PERFORMANCE BY PRE-FETCHING AND CACHING DATA DIRECTLY IN A COMMUNICATION PROCESSOR'S REGISTER SET

(75) Inventors: Duane E. Galbi, Cambridge, MA (US); Wilson P. Snyder, II, Hudson, MA (US); Daniel J. Lussier, Holliston, MA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 460 days.

(21) Appl. No.: 09/919,216

(22) Filed: Jul. 31, 2001

(65) Prior Publication Data

US 2002/0057708 A1 May 16, 2002

Related U.S. Application Data

(60) Provisional application No. 60/221,821, filed on Jul. 31, 2000.

(51) Int. Cl.[7] .............................................. H04L 12/54
(52) U.S. Cl. ...................... 370/392; 370/395.1; 370/412
(58) Field of Search ................................ 370/412–418, 370/395, 392; 711/118–146; 712/32, 34; 710/52–57

(56) References Cited

U.S. PATENT DOCUMENTS

| | | | | |
|---|---|---|---|---|
| 4,727,538 A | * | 2/1988 | Furchtgott et al. | 370/431 |
| 5,566,170 A | * | 10/1996 | Bakke et al. | 370/392 |
| 5,726,985 A | * | 3/1998 | Daniel et al. | 370/382 |
| 5,805,927 A | | 9/1998 | Bowes et al. | |
| 5,920,561 A | | 7/1999 | Daniel et al. | |
| 6,078,733 A | * | 6/2000 | Osborne | 709/250 |
| 6,195,739 B1 | * | 2/2001 | Wright et al. | 712/19 |
| 6,373,846 B1 | * | 4/2002 | Daniel et al. | 370/395.65 |

OTHER PUBLICATIONS

Lee, T. Andy, et al., "Low Power Data Management Architecture for Wireless Communications Signal Processing," Stanford University, IEEE 1998, pgs. 625–629.

* cited by examiner

Primary Examiner—Seema S. Rao
Assistant Examiner—Robert C Scheibel
(74) Attorney, Agent, or Firm—Keith Kind (57) ABSTRACT

Circuitry to free the core processor from performing the explicit read operation required to read data into the internal register set. The processor's register set is expanded and a "shadow register" set is provided. While the core processor is processing one event the "context" and "data" and other associated information for the next event is loaded into the shadow register set. When the core processor finishes processing an event, the core processor switches to the shadow register set and it can begin processing the next event immediately. With short service routines, there might not be time to fully pre-fetch the "context" and "data" associated with the next event before the current event ends. In this case, the core processor still starts processing the next event and the pre-fetch continues during the event processing. If the core processor accesses a register which is associated with part of the context for which the pre-fetch is still in progress the core processor will automatically stall or delay until the pre-fetch has completed reading the appropriate data.

7 Claims, 7 Drawing Sheets

ENHANCING PERFORMANCE BY PRE-FETCHING AND CACHING DATA DIRECTLY IN A COMMUNICATION PROCESSOR'S REGISTER SET

Related Applications

The current non-provisional application claims priority from the provisional application No. 60/221,821 entitled "Traffic Stream Processor" filed on Jul. 31, 2000.

FIELD OF THE INVENTION

The present invention is related to the field of communications, and more particularly to integrated circuits that process communication packets.

BACKGROUND OF THE INVENTION

Many communication systems transfer information in streams of packets. In general, each packet contains a header and a payload. The header contains control information, such as addressing or channel information, that indicates how the packet should be handled. The payload contains the information that is being transferred. Some examples of the types of packets used in communication systems include, Asynchronous Transfer Mode (ATM) cells, Internet Protocol (IP) packets, frame relay packets, Ethernet packets, or some other packet-like information block. As used herein, the term "packet" is intended to include packet segments.

Integrated circuits termed "traffic stream processors" have been designed to apply robust functionality to high-speed packet streams. Robust functionality is critical with today's diverse but converging communication systems. Stream processors must handle multiple protocols and inter-work between streams of different protocols. Stream processors must also ensure that quality-of service constraints, priority, and bandwidth requirements are met. This functionality must be applied differently to different streams, and there may be thousands of different streams.

Co-pending applications Ser. No. 09/639,966, 09/640,231 and 09/640,258, the content of which is hereby incorporated herein by reference, describe a integrated circuit for processing communication packets. As described in the above applications, the integrated circuit includes a core processor. The processor handles a series of tasks, termed "events". Most events have an associated service address, "context information" and "data". When an external resource initiates an event, the external resource supplies the core processor with a memory pointer to "context" information and also supplies the data to be associated with the event.

The context pointer is used to fetch the context from external memory and to store this "context" information in memory located on the chip. If the required context data has already been fetched onto the chip, the hardware recognizes this fact and sets the on chip context pointer to point to this already pre-fetched context data. Only a small number of the system "contexts" are cached on the chip at any one time. The rest of the system "contexts" are stored in external memory. This context fetch mechanism is described in the above referenced co-pending applications.

In order to process an event, the core processor needs the service address of the event as well as the "context" and "data" associated with the event. The service address is the starting address for the instructions used to service the event. The core processor branches to the service address in order to start servicing the event.

Typically, the core processor needs to access a portion of the "context" associated with the event so the appropriate part of the "context" is read into the core processor's local registers. When this is done, the core processor can read, and if appropriate modify, the "context" values. However, when the core processor modifies a "context" value, the "context" values stored outside of the core processor register must be updated to reflect this change. This can happen under direct programmer control or using the method described in the above referenced patent (U.S. Pat. No. 5,748,630). The "data" associated with an event is handled in a manner similar to that described for the "context".

In the circuit described in the above references co-pending applications, the processing core performed a register read which returned a pointer to the context, data, and service address associated with the next event. The processing core then needed to explicitly read the context and data into its internal register set.

SUMMARY OF THE INVENTION

The present invention frees the core processor from performing the explicit read operation required to read data into the internal register set. The present invention expands the processor's register set and provides a "shadow register" set. While the core processor is processing one event, the "context" and "data" and some other associated information for the next event is loaded into the shadow register set. When the core processor finishes processing an event, the core processor switches to the shadow register set and it can begin processing the next event immediately. With short service routines, there might not be time to fully pre-fetch the "context" and "data" associated with the next event before the current event ends. In this case, the core processor still starts processing the next event and the pre-fetch continues during the event processing. If the core processor accesses a register which is associated with part of the context for which the pre-fetch is still in progress, the core processor will automatically stall or delay until the pre-fetch has completed reading the appropriate data. Logic has been provided to handle several special situations, which are created by the use of the shadow registers, and to provide the programmer with control over the pre-fetching and service address selection progress.

DETAILED DESCRIPTION OF THE INVENTION

Various aspects of packet processing integrated circuits are discussed in U.S. Pat. No. 5,748,630, entitled "ASYN- CHRONOUS TRANSFER MODE CELL PROCESSING WITH LOAD MULTIPLE INSTRUCTION AND MEMORY WRITE-BACK", filed on May 9, 1996. The content of the above referenced patent is hereby incorporated by reference into this application in order to shorten and simplify the description in this application.

Figure 1:
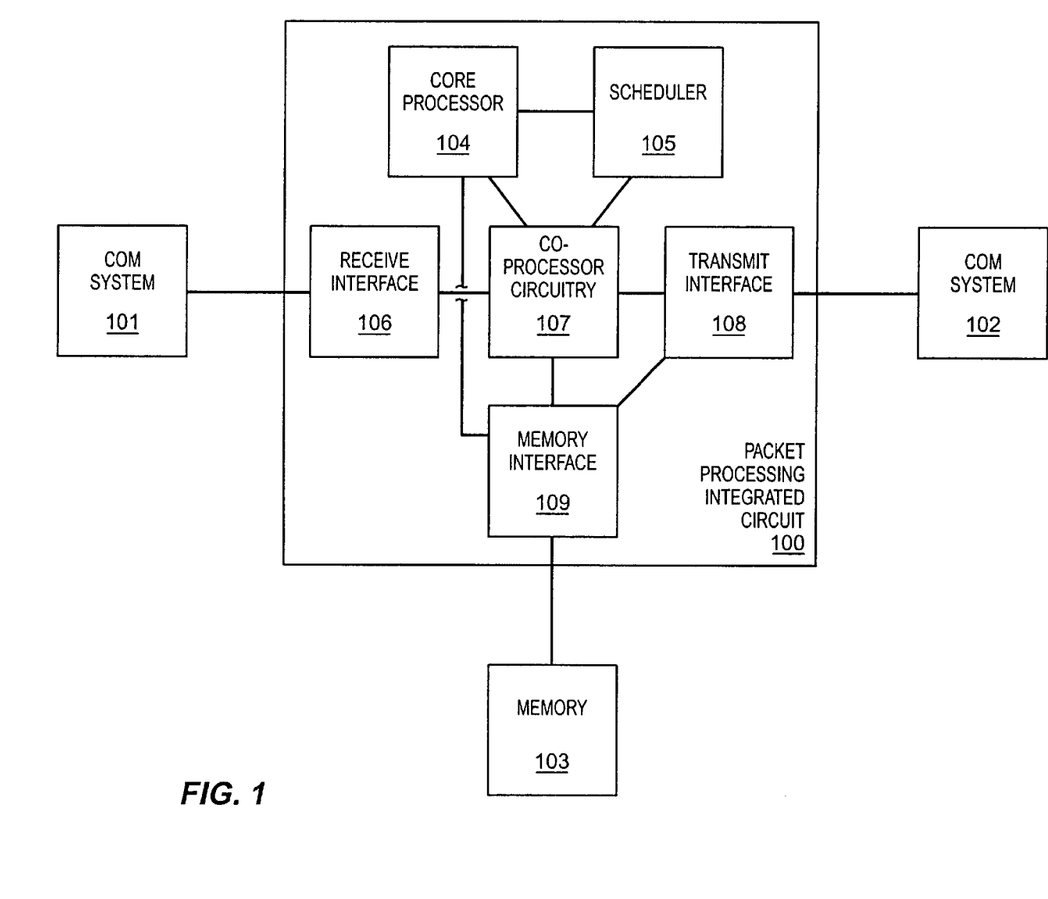
FIG. 1 is an overall block diagram of a packet processing integrated circuit in an example of the invention.

FIG. 1 is a block diagram that illustrates a packet processing integrated circuit 100 in an example of the invention. It should be understood that the present invention can also be applied to other types of processors. The operation of the circuit 100 will first be described with reference to FIGS. 1 to 4 and then the operation of the present invention will be described with reference to FIGS. 5 to 8.

Integrated circuit 100 includes a core processor 104, a scheduler 105, receive interface 106, co-processor circuitry 107, transmit interface 108, and memory interface 109. These components may be interconnected through a memory crossbar or some other type of internal interface. Receive interface 106 is coupled to communication system 101. Transmit interface 108 is coupled to communication system 102. Memory interface is coupled to memory 103.

Communication system 101 could be any device that supplies communication packets with one example being the switching fabric in an Asynchronous Transfer Mode (ATM) switch. Communication system 101 could be any device that receives communication packets with one example being the physical line interface in the ATM switch. Memory 103 could be any memory device with one example being Random Access Memory (RAM) integrated circuits. Receive interface 106 could be any circuitry configured to receive packets with some examples including UTOPIA interfaces or Peripheral Component Interconnect (PCI) interfaces. Transmit interface 108 could be any circuitry configured to transfer packets with some examples including UTOPIA interfaces or PCI interfaces.

Core processor 104 is a micro-processor that executes networking application software. Core-processor 104 supports an instruction set that has been tuned for networking operations especially context switching. As described herein, core processor 104 has the following characteristics: 166 MHz, pipelined single-cycle operation, RISC-based design, 32-bit instruction and register set, K instruction cache, 8 KB zero-latency scratchpad memory, interrupt/trap/halt support, and C compiler readiness.

Scheduler 105 comprises circuitry configured to schedule and initiate packet processing that typically results in packet transmissions from integrated circuit 100, although scheduler 105 may also schedule and initiate other activities. Scheduler 105 schedules upcoming events, and as time passes, selects scheduled events for processing and re-schedules unprocessed events. Scheduler 105 transfers processing requests for selected events to co-processor circuitry 107. Scheduler 105 can handle multiple independent schedules to provide prioritized scheduling across multiple traffic streams. To provide scheduling, scheduler 105 may execute a guaranteed cell rate algorithm to implement a leaky bucket or a token bucket scheduling system. The guaranteed cell rate algorithm is implemented through a cache that holds algorithm parameters. Scheduler 105 is described in detail in the above referenced co-pending patent applications.

Co-processor circuitry 107 receives communication packets from receive interface 106 and memory interface 109 and stores the packets in internal data buffers. Co-processor circuitry 107 correlates each packet to context information describing how the packet should be handled. Co-processor circuitry 107 stores the correlated context information in internal context buffers and associates individual data buffers with individual context buffers to maintain the correlation between individual packets and context information. Importantly, co-processor circuitry 107 ensures that only one copy of the correlated context information is present the context buffers to maintain coherency. Multiple data buffers are associated with a single context buffer to maintain the correlation between the multiple packets and the single copy the context information.

Co-processor circuitry 107 also determines a prioritized processing order for core processor 104. The prioritized processing order controls the sequence in which core processor 104 handles the communication packets. The prioritized processing order is typically based on the availability of all of the resources and information that are required by core processor 104 to process a given communication packet. Resource state bits are set when resources become available, so co-processor circuitry 107 may determine when all of these resources are available by processing the resource state bits. If desired, the prioritized processing order may be based on information in packet handling requests. Co-processor circuitry 107 selects scheduling algorithms based on an internal scheduling state bits and uses the selected scheduling algorithms to determine the prioritized processing order. The algorithms could be round robin, service-to-completion, weighted fair queuing, simple fairness, first-come first-serve, allocation through priority promotion, software override, or some other arbitration scheme. Thus, the prioritization technique used by co-processor circuitry 107 is externally controllable. Co-processor circuitry 107 is described in more detail with respect to FIGS. 2–4.

Memory interface 109 comprises circuitry configured to exchange packets with external buffers in memory 103. Memory interface 109 maintains a pointer cache that holds pointers to the external buffers. Memory interface 109 allocates the external buffers when entities, such as core processor 104 or co-processor circuitry 107, read pointers from the pointer cache. Memory interface 109 de-allocates the external buffers when the entities write the pointers to the pointer cache. Advantageously, external buffer allocation and de-allocation is available through an on-chip cache read/write. Memory interface 109 also manages various external buffer classes, and handles conditions such as external buffer exhaustion. Memory interface 109 is described in detail in the above referenced patent applications.

In operation, receive interface 106 receives new packets from communication system 101, and scheduler 105 initiates transmissions of previously received packets that are typically stored in memory 103. To initiate packet handling, receive interface 106 and scheduler 105 transfer requests to co-processor circuitry 107. Under software control, core processor 104 may also request packet handling from co-processor circuitry 107. Co-processor circuitry 107 fields the requests, correlates the packets with their respective context information, and creates a prioritized work queue for core processor 104. Core processor 104 processes the packets and context information in order from the prioritized work queue. Advantageously, co-processor circuitry 107 operates in parallel with core processor 104 to offload the context correlation and prioritization tasks to conserve important core processing capacity. In response to packet handling, core processor 104 typically initiates packet transfers to either memory 103 or communication system 102. If the packet is transferred to memory 103, then core processor 104 instructs scheduler 105 to schedule and initiate future packet transmission or processing. Advantageously, scheduler 105 operates in parallel with core processor 104 to offload scheduling tasks and conserve important core processing capacity.

In response to packet handling, core processor 104 typically initiates packet transfers to either memory 103 or communication system 102. If the packet is transferred to memory 103, then core processor 104 instructs scheduler 105 to schedule and initiate future packet transmission or processing. Advantageously, scheduler 105 operates in parallel with core processor 104 to offload scheduling tasks and conserve important core processing capacity.

Various data paths are used in response to core processor 104 packet transfer instructions. Co-processor circuitry 107 transfers packets directly to communication system 102 through transmit interface 108. Co-processor circuitry 107 transfers packets to memory 103 through memory interface 109 with an on-chip pointer cache. Memory interface 109 transfers packets from memory 103 to communication system 102 through transmit interface 108. Co-processor circuitry 107 transfers context information from a context buffer through memory interface 109 to memory 103 if there are no packets in the data buffers that are correlated with the context information in the context buffer. Advantageously, memory interface 109 operates in parallel with core processor 104 to offload external memory management tasks and conserve important core processing capacity.

Figure 2:
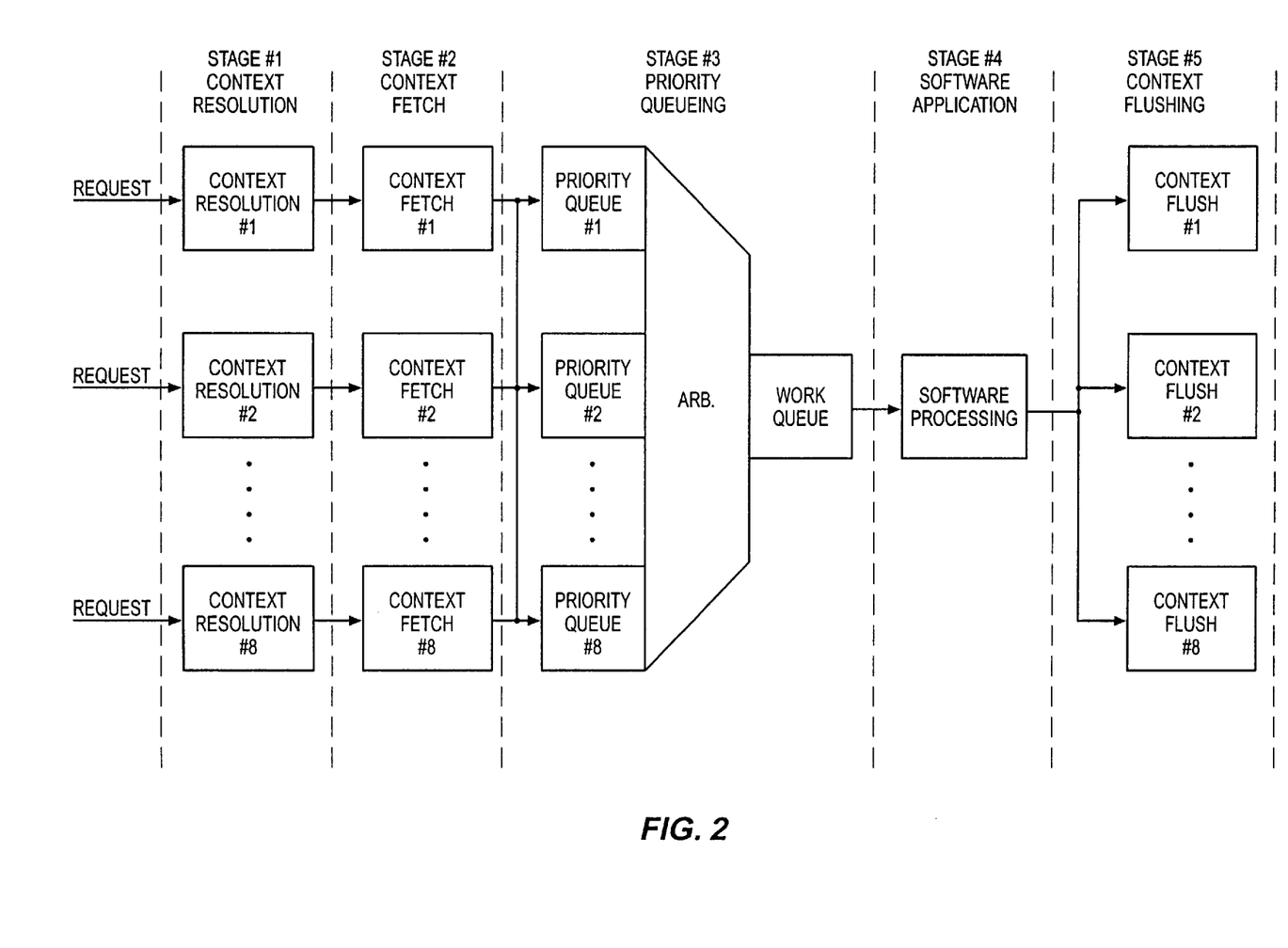
FIG. 2 is a block diagram that illustrates packet processing stages and the pipe-lining used by the circuit in an example of the invention.
Figure 3:
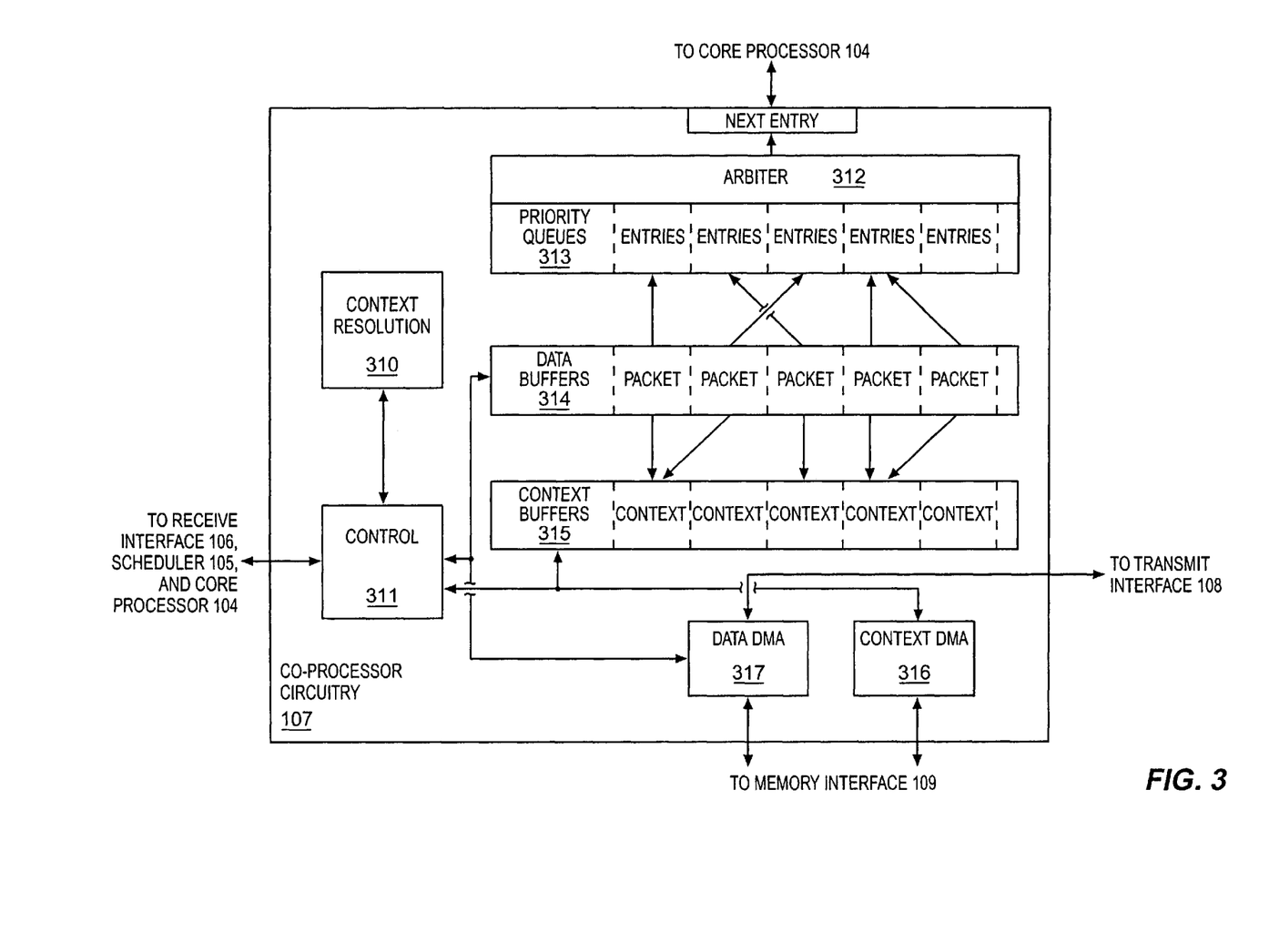
FIG. 3 is a diagram illustrating circuitry in the co-processing relating to context and data buffer processing in an example of the invention.
Figure 4:
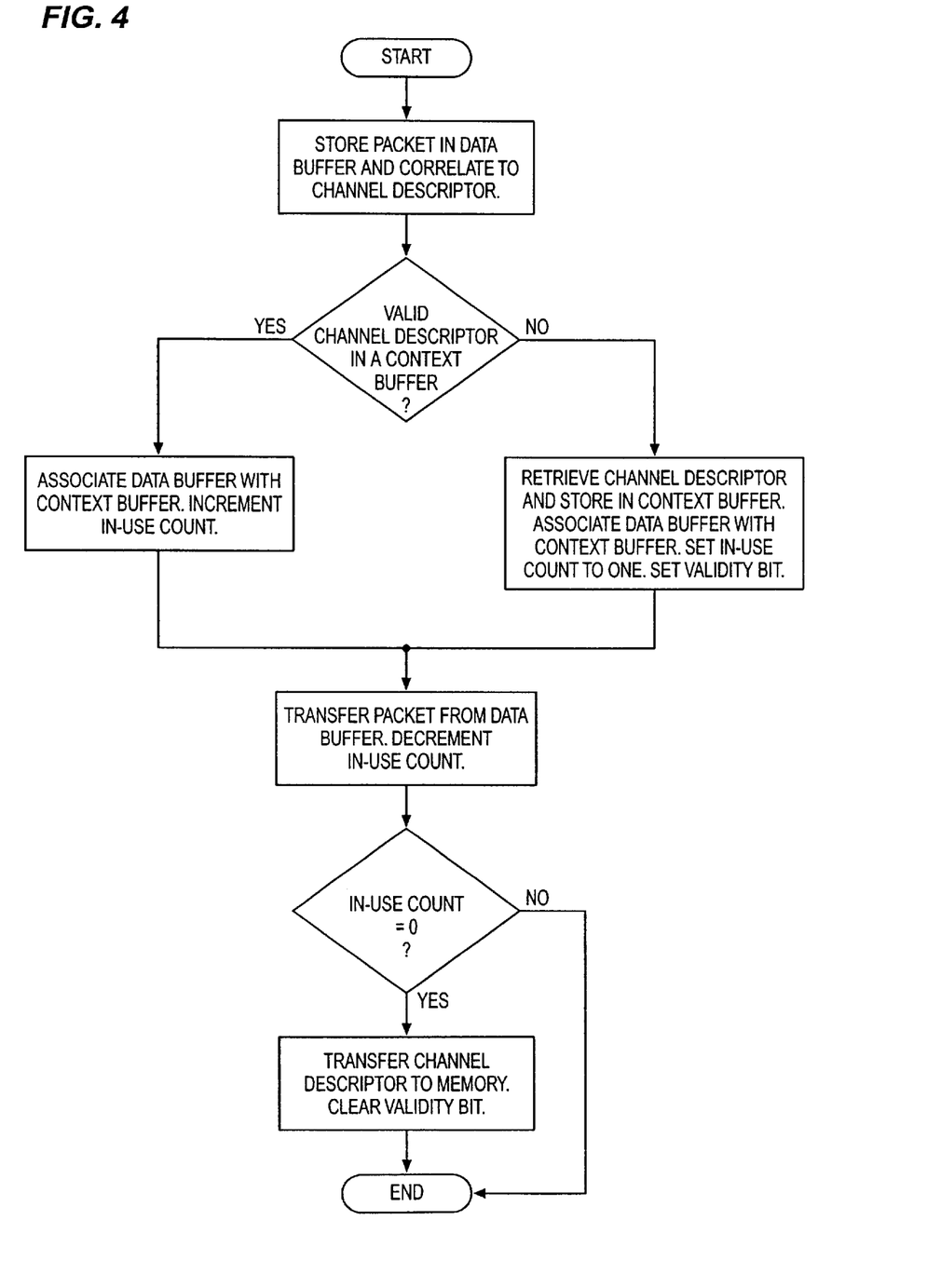
FIG. 4 is a block program flow diagram illustrating buffer correlation and in-use counts in an example of the invention.

Co-processor Circuitry—FIGS. 2–4:

FIGS. 2–4 depict a specific example of co-processor circuitry. Those skilled in the art will understand that FIGS. 2–4 have been simplified for clarity.

FIG. 2 illustrates how co-processor circuitry 107 provides pipe-lined operation. FIG. 2 is vertically separated by dashed lines that indicate five packet processing stages: 1) context resolution, 2) context fetching, 3) priority queuing, 4) software application, and 5) context flushing. Co-processor circuitry 107 handles stages 1–3 to provide hardware acceleration. Core processor 104 handles stage 4 to provide software control with optimized efficiency due to stages 1–3. Co-processor circuitry 107 also handles stage 5. Co-processor circuitry 107 has eight pipelines through stages 1–3 and 5 to concurrently process multiple packet streams.

In stage 1, requests to handle packets are resolved to a context for each packet in the internal data buffers. The requests are generated by receive interface 106, scheduler 105, and core processor 104 in response to incoming packets, scheduled transmissions, and application software instructions. The context information includes a channel descriptor that has information regarding how packets in one of 64,000 different channels are to be handled. For example, a channel descriptor may indicate service address information, traffic management parameters, channel status, stream queue information, and thread status. Thus, 64,000 channels with different characteristics are available to support a wide array of service differentiation. Channel descriptors are identified by channel identifiers. Channel identifiers may be indicated by the request. A map may be used to translate selected bits from the packet header to a channel identifier. A hardware engine may also perform a sophisticated search for the channel identifier based on various information. Different algorithms that calculate the channel identifier from the various information may be selected by setting correlation state bits in co-processor circuitry 107. Thus, the technique used for context resolution is externally controllable.

In stage 2, context information is fetched, if necessary, by using the channel identifiers to transfer the channel descriptors to internal context buffers. Prior to the transfer, the context buffers are first checked for a matching channel identifier and validity bit. If a match is found, then the context buffer with the existing channel descriptor is associated with the corresponding internal data buffer holding the packet.

In stage 3, requests with available context are prioritized and arbitrated for core processor 104 handling. The priority may be indicated by the request—and it may be the source of the request. The priority queues 1–12 are 8 entries deep. Priority queues 1–12 are also ranked in a priority order by queue number. The priority for each request is determined, and when the context and data buffers for the request are valid, an entry for the request is placed in one of the priority queues that corresponds to the determined priority. The entries in the priority queues point to a pending request state RAM that contains state information for each data buffer. The state information includes a data buffer pointer, a context pointer, context validity bit, requester indicator, port status, a channel descriptor loaded indicator.

The work queue indicates the selected priority queue entry that core processor 104 should handle next. To get to the work queue, the requests in priority queues are arbitrated using one of various algorithms such as round robin, service-to-completion, weighted fair queuing, simple fairness, first-come first-serve, allocation through priority promotion, and software override. The algorithms may be selected through scheduling state bits in co-processor circuitry 107. Thus, the technique used for prioritization is externally controllable. Co-processor circuitry 107 loads core processor 104 registers with the channel descriptor information for the next entry in the work queue.

In stage 4, core processor 104 executes the software application to process the next entry in the work queue which points to a portion of the pending state request RAM that identifies the data buffer and context buffer. The context buffer indicates one or more service addresses that direct the core processor 104 to the proper functions within the software application. One such function of the software application is traffic shaping to conform to service level agreements. Other functions include header manipulation and translation, queuing algorithms, statistical accounting, buffer management, inter-working, header encapsulation or stripping, cyclic redundancy checking, segmentation and reassembly, frame relay formatting, multicasting, and routing. Any context information changes made by the core processor are linked back to the context buffer in real time.

In stage 5, context is flushed. Typically, core processor 104 instructs coprocessor circuitry 107 to transfer packets to off-chip memory 103 or transmit interface 108. If no other data buffers are currently associated with the pertinent context information, then co-processor circuitry 107 transfers the context information to off-chip memory 103.

FIG. 3 is a block diagram that illustrates co-processor circuitry 107 in an example of the invention. Co-processor circuitry 107 comprises a hardware engine that is firmware-programmable in that it operates in response to state bits and register content. In contrast, core processor 104 is a microprocessor that executes application software. Co-processor circuitry 107 operates in parallel with core processor 104 to conserve core processor 104 capacity by off-loading numerous tasks from the core processor 104.

Co-processor circuitry 107 comprises context resolution 310, control 311, arbiter 312, priority queues 313, data buffers 314, context buffers 315, context DMA 316, and data DMA 317. Data buffers 314 hold packets and context buffers 315 hold context information, such as a channel descriptor. Data buffers 314 are relatively small and of a fixed size, such as 64 bytes, so if the packets are ATM cells, each data buffer holds only a single ATM cell and ATM cells do not cross data buffer boundaries.

Individual data buffers 314 are associated with individual context buffers 315 as indicated by the downward arrows. Priority queues 313 hold entries that represent individual data buffers 314 as indicated by the upward arrows. Thus, a packet in one of the data buffers is associated with its context information in an associated one of the context buffers 315 and with an entry in priority queues 313. Arbiter 312 presents a next entry from priority queues 313 to core processor 104 which handles the associated packet in the order determined by arbiter 312.

Context DMA 316 exchanges context information between memory 103 and context buffers 315 through memory interface 109. Context DMA automatically updates queue pointers in the context information. Data DMA 317 exchanges packets between data buffers 314 and memory 103 through memory interface 109. Data DMA 317 also transfers packets from memory 103 to transmit interface 108 through memory interface 109. Data DMA 317 signals context DMA 316 when transferring packets off-chip, and context DMA 316 determines if the associated context should be transferred to off-chip memory 103. Both DMAs 316–317 may be configured to perform CRC calculations.

For a new packet from communication system 101, control 311 receives the new packet and a request to handle the new packet from receive interface 106. Control 311 receives and places the packet in one of the data buffers 314 and transfers the packet header to context resolution 310. Based on gap state bits, a gap in the packet may be created between the header and the payload in the data buffer, so core processor 104 can subsequently write encapsulation information to the gap without having to create the gap. Context resolution 310 processes the packet header to correlate the packet with a channel descriptor, although in some cases, receive interface 106 may have already performed this context resolution. The channel descriptor comprises information regarding packet transfer over a channel.

Control 311 determines if the channel descriptor that has been correlated with the packet is already in one of the context buffers 315 and is valid. If so, control 311 does not request the channel descriptor from off-chip memory 103. Instead, control 311 associates the particular data buffer 314 holding the new packet with the particular context buffer 315 that already holds the correlated channel descriptor. This prevents multiple copies of the channel descriptor from existing in context buffers 314. Control 311 then increments an in-use count for the channel descriptor to track the number of data buffers 314 that are associated with the same channel descriptor.

If the correlated channel descriptor is not in context buffers 315, then control 311 requests the channel descriptor from context DMA 316. Context DMA 316 transfers the requested channel descriptor from off-chip memory 103 to one of the context buffers 315 using the channel descriptor identifier, which may be an address, that was determined during context resolution. Control 311 associates the context buffer 315 holding the transferred channel descriptor with the data buffer 314 holding the new packet to maintain the correlation between the new packet and the channel descriptor. Control 311 also sets the in-use count for the transferred channel descriptor to one and sets the validity bit to indicate context information validity.

Control 311 also determines a priority for the new packet. The priority may be determined by the source of the new packet, header information, or channel descriptor. Control 311 places an entry in one of priority queues 313 based on the priority. The entry indicates the data buffer 314 that has the new packet. Arbiter 312 implements an arbitration scheme to select the next entry for core processor 104. Core processor 104 reads the next entry and processes the associated packet and channel descriptor in the particular data buffer 314 and context buffer 315 indicated in the next entry.

Each priority queue has a service-to-completion bit and a sleep bit. When the service-to-completion bit is set, the priority queue has a higher priority that any priority queues without the service-to-completion bit set. When the sleep bit is set, the priority queues is not processed until the sleep bit is cleared. The ranking of the priority queue number breaks priority ties. Each priority queue has a weight from 0–15 to ensure a certain percentage of core processor handling. After an entry from a priority queue is handled, its weight is decremented by one if the service-to-completion bit is not set.

The weights are re-initialized to a default value after 128 requests have been handled or if all weights are zero. Each priority queue has a high and low watermark. When outstanding requests that are entered in a priority queue exceed its high watermark, the service-to-completion bit is set. When the outstanding requests fall to the low watermark, the service-to-completion bit is cleared. The high watermark is typically set at the number of data buffers allocated to the priority queue.

Core processor 104 may instruct control 311 to transfer the packet to off-chip memory 103 through data DMA 317. Control 311 decrements the context buffer in-use count, and if the in-use count is zero (no data buffers 314 are associated with the context buffer 315 holding the channel descriptor), then control 311 instructs context DMA 316 to transfer the channel descriptor to off-chip memory 103. Control 311 also clears the validity bit. This same general procedure is followed when scheduler 105 requests packet transmission, except that in response to the request from scheduler 105, control 311 instructs data DMA 317 to transfer the packet from memory 103 to one of data buffers 314.

FIG. 4 is a flow diagram that illustrates the operation of co-processor circuitry 107 when correlating buffers in an example of the invention. Co-processor circuitry 107 has eight pipelines to concurrently process multiple packet streams in accord with FIG. 3.

First, a packet is stored in a data buffer, and the packet is correlated to a channel descriptor as identified by a channel identifier. The channel descriptor comprises the context information regarding how packets in one of 64,000 different channels are to be handled.

Next, context buffers 314 are checked for a valid version of the correlated channel descriptor. This entails matching the correlated channel identifier with a channel identifier in a context buffer that is valid. If the correlated channel descriptor is not in a context buffer that is valid, then the channel descriptor is retrieved from memory 103 and stored in a context buffer using the channel identifier. The data buffer holding the packet is associated with the context buffer holding the transferred channel descriptor. An in-use count for the context buffer holding the channel descriptor is set to one. A validity bit for the context buffer is set to indicate that the channel descriptor in the context buffer is valid. If the correlated channel descriptor is already in a context buffer that is valid, then the data buffer holding the packet is associated with the context buffer already holding the channel descriptor. The in-use count for the context buffer holding the channel descriptor is incremented.

Typically, core processor 104 instructs co-processor circuitry 107 to transfer packets to off-chip memory 103 or transmit interface 108. Data DMA 317 transfers the packet and signals context DMA 316 when finished. Context DMA 316 decrements the in-use count for the context buffer holding the channel descriptor, and if the decremented in-use count equals zero, then context DMA 316 transfers the channel descriptor to memory 103 and clears the validity bit for the context buffer.

Figure 5:
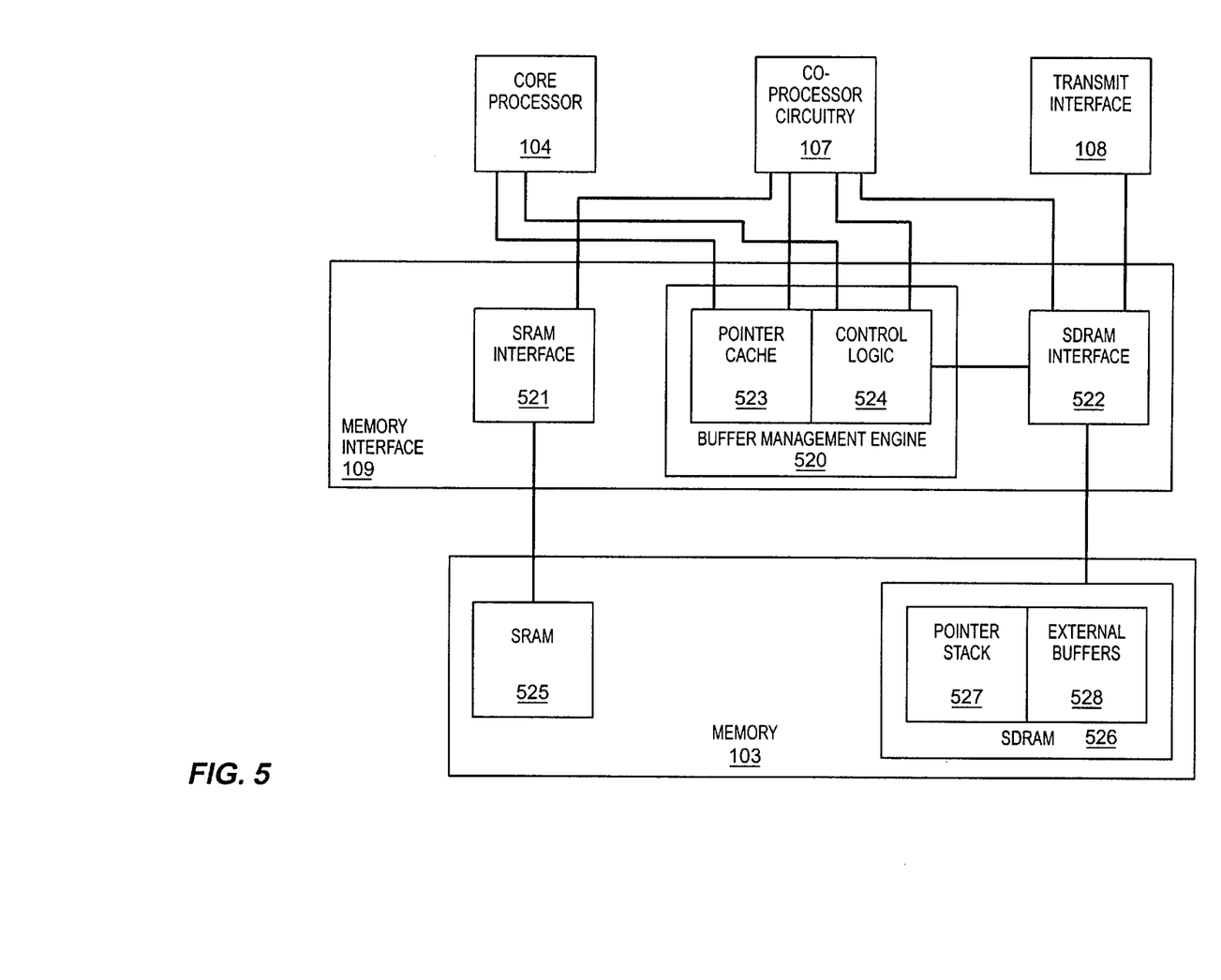
FIG. 5 is a block diagram of the buffer management circuitry in an example of the invention.
Figure 6:
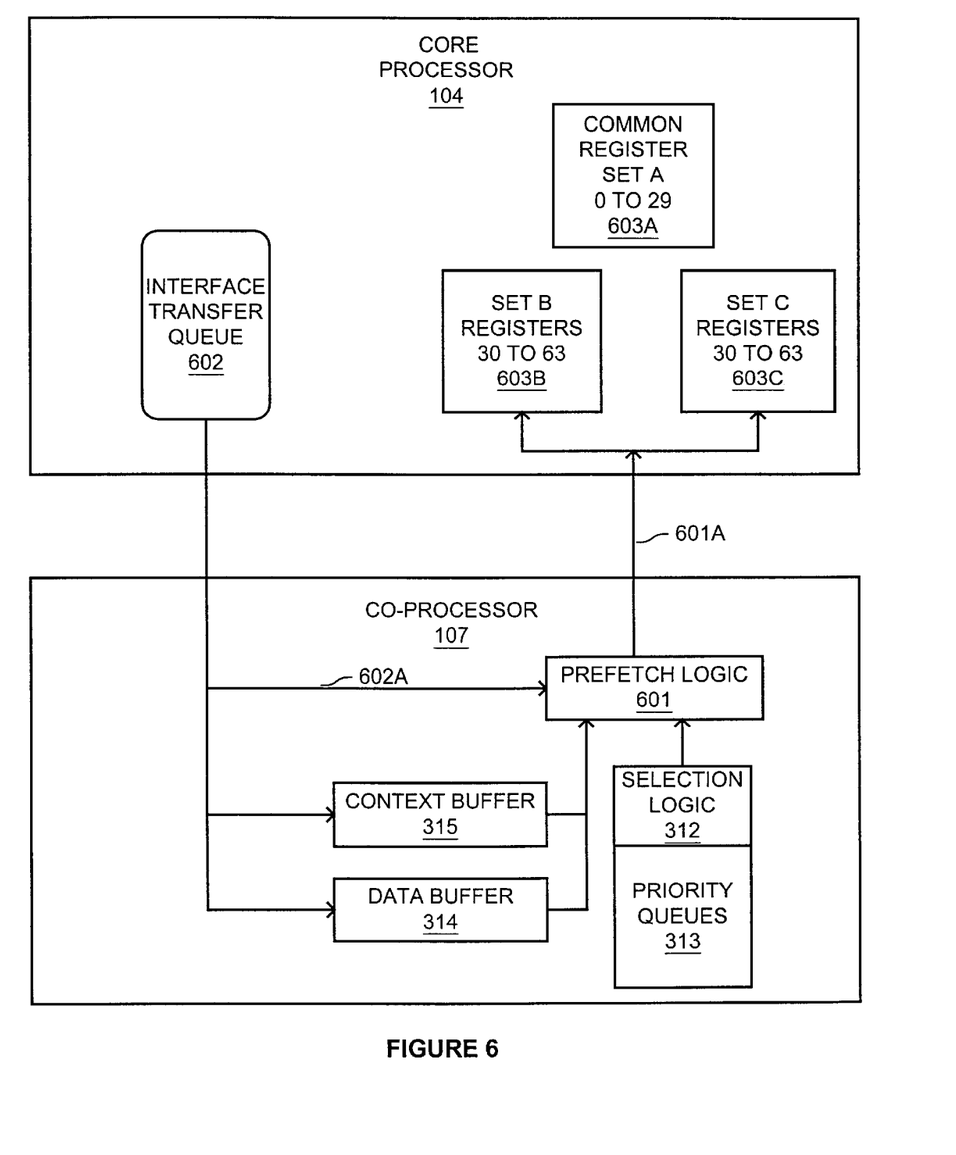
FIG. 6 is a block diagram showing the transfer queue and registers in the core processor in an example of the invention.

Memory Interface 109—FIGS. 5–6

FIGS. 5–6 depict a specific example of memory interface circuitry in accord with the present invention. Those skilled in the art will appreciate numerous variations from the circuitry shown in this example may be made. Furthermore, those skilled in the art will appreciate that some conventional aspects of FIGS. 5–6 have been simplified or omitted for clarity.

FIG. 5 is a block diagram that illustrates memory interface 109. Memory interface 109 comprises a hardware circuitry engine that is firmware-programmable in that operates in response to state bits and register content. In contrast, core processor 104 is a micro-processor that executes application software. Memory interface 109 operates in parallel with core processor 104 to conserve core processor 104 capacity by off-loading numerous tasks from the core processor 104.

Both FIG. 1 and FIG. 5 show memory 103, core processor 104, co-processor circuitry 107, transmit interface 108, and memory interface 109. Memory 103 comprises Static RAM (SRAM) 525 and Synchronous Dynamic RAM (SDRAM) 526, although other memory systems could also be used. SDRAM 526 comprises pointer stack 527 and external buffers 528. Memory interface 109 comprises buffer management engine 520, SRAM interface 521, and SDRAM interface 522. Buffer management engine 520 comprises pointer cache 523 and control logic 524.

Conventional components could be used for SRAM interface 521, SDRAM interface 522, SRAM 525, and SDRAM 526. SRAM interface 521 exchanges context information between SRAM 525 and co-processor processor circuitry 107. External buffers 528 use a linked list mechanism to store communication packets externally to integrated circuit 100. Pointer stack 527 is a cache of pointers to free external buffers 528 that is initially built by core processor 104. Pointer cache 523 stores pointers that were transferred from pointer stack 527 and correspond to external buffers 528. Sets of pointers may be periodically exchanged between pointer stack 527 and pointer cache 523. Typically, the exchange from stack 527 to cache 523 operates on a first-in/first-out basis.

In operation, core processor 104 writes pointers to free external buffers 528 to pointer stack 527 in SDRAM 526. Through SDRAM interface 522, control logic 524 transfers a subset of these pointers to pointer cache 523. When an entity, such as core processor 104, co-processor circuitry 107, or an external system, needs to store a packet in memory 103, the entity reads a pointer from pointer cache 523 and uses the pointer to transfer the packet to external buffers 528 through SDRAM interface 522. Control logic 524 allocates the external buffer as the corresponding pointer is read from pointer cache 523. SDRAM stores the packet in the external buffer indicated by the pointer. Allocation means to reserve the buffer, so other entities do not improperly write to it while it is allocated.

When the entity no longer needs the external buffer—for example, the packet is transferred from memory 103 through SDRAM interface 522 to co-processor circuitry 107 or transmit interface 108, then the entity writes the pointer to pointer cache 523. Control logic 524 de-allocates the external buffer as the corresponding pointer is written to pointer cache 523. De-allocation means to release the buffer, so other entities may reserve it. The allocation and de-allocation process is repeated for other external buffers 528.

Control logic 524 tracks the number of the pointers in pointer cache 523 that point to de-allocated external buffers 528. If the number reaches a minimum threshold, then control logic 524 transfers additional pointers from pointer stack 527 to pointer cache 523. Control logic 524 may also transfer an exhaustion signal to core processor 104 in this situation. If the number reaches a maximum threshold, then control logic 524 transfers an excess portion of the pointers from pointer cache 523 to pointer stack 527.

FIG. 6 illustrates in more detail the registers 603A, 603B and 603C in core processor 104 and the interface transfer queue 602 between core processor 104 and co-processor 107. In the embodiment of the invention described herein, there are sixty four registers 0 to 63 available to a user of the system. Registers 0 to 29 are used to store general state information and registers 30 to 63 are used to store "context information", "data information", and "event specific state information". There is also a shadow set of registers that corresponds to registers 30 to 63. Thus, with reference to FIG. 6, in general, when the core processor 104 is processing a series of events, the first event uses registers A & B, the next event uses registers A & C, the next event uses registers A & B, the next event uses registers A and C, etc. Thus, at any one particular time, one set of registers (either B or C) is the active set of registers and at the same time the other set of registers (either B or C) is a shadow set of registers that is being loaded for the next event, which will be processed. In general, register sets B and C alternate as the active and shadow register sets.

In some embodiments, the registers 603A, 603B and 603C are low latency memory. In some embodiments, the data buffers in co-processor 107 are medium latency memory. In some embodiments, the off chip memory 103 is a high latency memory. Thus, some embodiments of the invention make possible the increased use of the low latency memory available to the core processor 104.

The data buffers 314 and the context buffers 315, are part of the control of the co-processor 107. The co-processor 107 can read data and context from the cache memory via memory interface 109 and provide the data and context to the core processor 104 over the data bus indicated by the arrow 601A.

While an event is being processed using registers A and B, registers C are loaded with data and context information needed to process the next event. In some embodiments, the registers shown in FIG. 6 are not a cache memory. The registers shown in FIG. 6 are the on chip registers, which are part of the core processor 104.

The pre-fetch block 601 shown is responsible for controlling the co-processor pre-fetch processing. Based on signals from the core processor 104 and the state of the current pre-fetch, this unit indicates to the work queue selection logic (312) when to select the top element from the work queue and to return the identifying parameters back to the pre-fetch logic block. Based on these parameters, the pre-fetch block controls the reading of the appropriate "context" and "data" buffer and the sending of the data to the core processor 104. Event processing does not always require that the full "context" and "data" buffer are pre-fetched to the core processor 104, so the pre-fetch unit allows the core processor 104 to configure the amount of the "context" and "data" data buffer which is sent by the pre-fetch logic to the core processor 104. In the current implementation, a different configuration can be attached to each of the priority queues (313), and the priority queue picked by the selection logic determines which configuration is used. However, it will be appreciated by those skilled in the art that this configuration information could be supplied in a different manner, such as having a global register or allowing each service address to indicated to the pre-fetch unit the maximum amount of pre-fetched information it could need.

The pre-fetch logic 601 also indicates to the core processor 104 whether to swap to the shadow register set when the core processor 104 begins processing a new event. Typically, the core processor 104 swaps to the shadow register set; however, there are special conditions, as described later in this document, under which the pre-fetch logic 601 can determine that the core processor 104 should not swap to the shadow register set. The program running on the core processor 104 can, in certain case, determine in advance that it should always or never swap to the shadow "context" or "data" register set. The core processor 104 can indicate this by setting the configuration bits in the pre-fetch logic 601 which force the logic to always, never, or when appropriate indicate to the core processor 104 that it should swap to the shadow register set. For instance, in the case where the pre-fetched "data" registers are never being used, the core processor 104 could configure the pre-fetch logic 601 to indicate that the core processor 104 should never swap to the "data" shadow register set. In this case, the core processor 104 would then be free to use the "data" registers for other purposes. As with the above described case, the configuration bits for this option are associated with each priority queue, and hence, the configuration bits used are determined by the priority queue which is selected.

Another function associated with the pre-fetch logic 601 is to determine the service address associated with the pre-fetched event. In the current implementation, the pre-fetch logic 601 can pick the service address from the a set of fixed addresses or from the "context" data which is being fetched. The location the pre-fetch logic 601 uses to pick the service address, the service address selection field, is configured on a per priority queue basis, and hence this field is determined by the priority queue selected. In addition, the resource which initiates an event can also pass a field which is used to modify the service address selection field just for the selection of this particular event's service address. Various functions could be used to combine the field the resource supplied with the field stored in the configuration registers. The function which has been implemented was exclusion-or. Other possible choices could have been addition, and or replacement.

Figure 7:
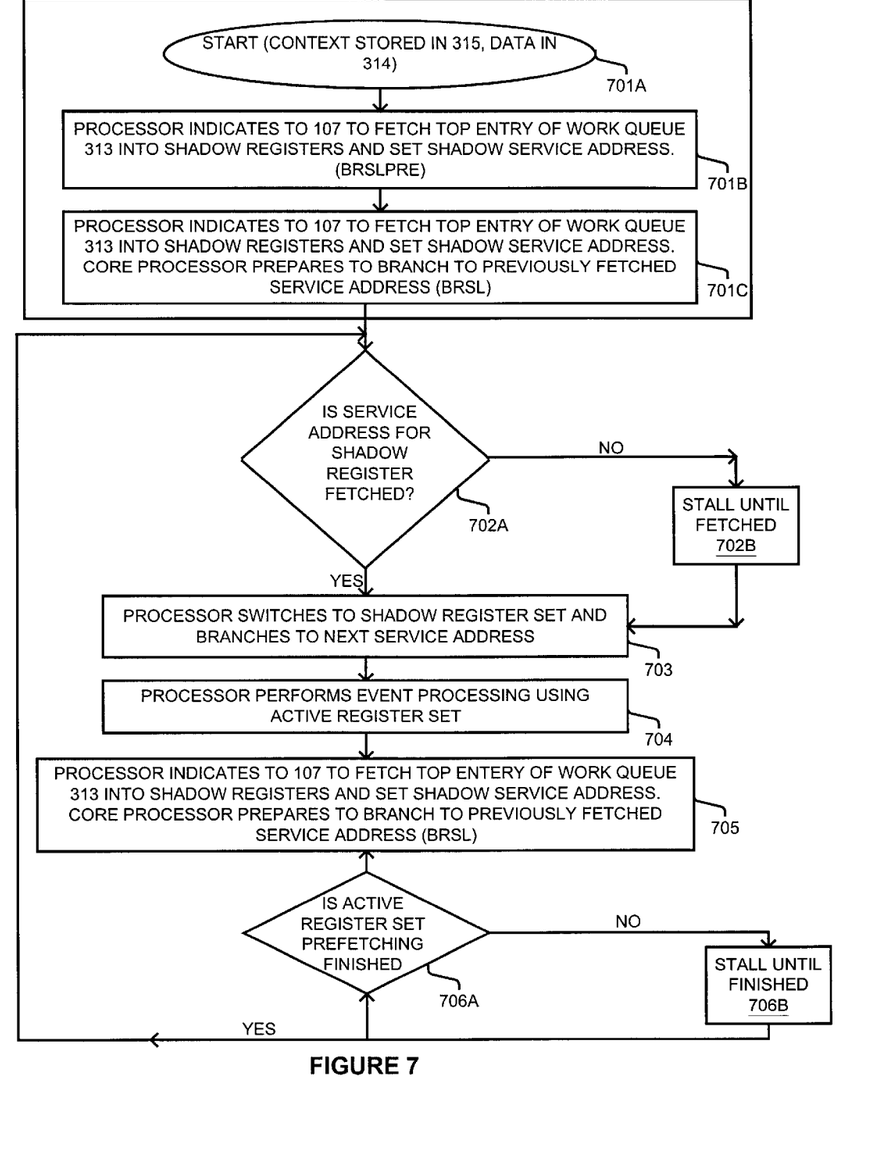
FIG. 7 is a block program flow diagram illustrating an operation in an example of the invention.

The overall operation of the pre-fetch system is illustrated in FIG. 7. The process begins at some point with the state indicted by block 701. As indicated by block 701A, the context and data are stored in buffers 314 and 315 using the methods previously described and the core processor 104 is using an active register set. As indicated by block 701 B, the core processor 104 needs to pre-fetch the initial events data into its shadow register set. This initial pre-fetch is performed using what is termed the BRSLPRE instruction. This instruction indicates to the co-processor 107 to pre-fetch data for the next event into the shadow register file, and to send the corresponding service address. This core processor 104 instruction does not change the program flow of the core processor 104, but rather is serves as a way to initialize or reinitialize the event information stored in the shadow register file. As indicated by block 701C, after issuing the BRSLPRE instruction, the core processor 104 is now ready to begin event processing. The core processor 104 sends a command to the co-processor 107 to fetch the top entry on the work queue 313 into the shadow register and to send the next service address. In addition, the core processor 104 prepares to branch to the previously pre-fetched service address. This is termed a BRSL instruction.

As indicated by steps 702A, the core processor 104 determines if the Service Address for the Shadow register has been fetched. If not, the core processor 104 stalls until the Service Address for the Shadow register has been fetched in step 702B. It should be noted that the service address in question is not the service address determined by the proceeding BRSL instruction (701C), but rather by the earlier BRSL instruction (701B), which initiated the pre-fetch of data into the shadow register set. As indicated by step 703, when the service address for the shadow register has been fetched, the core processor 104 switches to the shadow register set and branches to the appropriate service address.

The core processor 104 then performs event processing using the then active register set as indicated by step 704. It is noted that all the requested data does not need to be pre-fetched into the core processor shadow register set before the core processor 104 can switch to this register set. The pre-fetching of data into a register set can happen concurrently with the progressing of an event using this register set. If the data required by the event progressing has not yet been pre-fetched, the core processor 104 operation is automatically stalled or suspended until the data becomes available.

As indicated by step 705, after performing the processing required by an event, the core processor 104 next sends a command to co-processor 107 to fetch the top entry in the work queue 313 into the shadow registers and to set the next service address. In addition, the core processor 104 begins to branch to the previously pre-fetched service address. As indicated previously, this can be described as performing a BRSL instruction.

As indicated by steps 706 and 706A, the core processor 104 can not branch to a new service address until the active register pre-fetching operation has been finished. The core processor 104 operation is stalled until this pre-fetching has been finished. Finishing the pre-fetch may consist of terminating the pre-fetch or allowing the pre-fetch to complete. The process then repeats using the steps described above using steps 702 through 706.

In some embodiments, the pre-fetch logic 601 handles two special situations. One situation is when back to back events are taken which use the same "context" and/or "data" information. Since the core processor 104 can be updating the "context" and "data" information while the next event "data" and "context" is being pre-fetched, if the next event context is the same as the current context, the pre-fetched context is not assured to reflect all the changes the processing core has made to the context. (i.e. the pre-fetched data can be stale). Since in this situation, the current registers do reflect all the changes the core processor 104 has made to the context, there is no need to swap to the shadow register set, and the BRSL instruction (blocks 701B and 705 in FIG. 7) does not switch to the shadow register set in this situation.

Determining the appropriate service address in this situation also requires some special handling. If the work-queue is set to extract the service address from the "context" and the processing core changes this service address, then the service address determined by the pre-fetch logic 601 might be stale. In order to avoid this problem, a mode has been added to the work queue selection hardware 312, which does not allow back to back event from the same work queue in a first embodiment. This allows the programmer to avoid the case described above. In a second embodiment, back to back events are allowed, but a write to a BRSL interlock address is issued, after the service address has been changed. Writing to this address stalls the next BRSL instruction until the BRSL interlock address write has left the queue shown in FIG. 602. Since the BRSL interlock address write happened after the service address update, the service address update must have cleared this queue as well. There is pre-fetch logic 601 which snoops the output of the queue 602 and checks for writes which will effect the service address of the currently pre-fetched event (indicated as 602A on FIG. 6). If such a write is detected, the logic updates the next service address appropriately. Writing to the BRSL interlock address after the service address has changed assures that this snooping logic will be able to update the service address before the BRSL instruction uses this service address.

Another special situation to the pre-fetch mechanism (hereinafter referred to as the ABA case) occurs when the pre-fetch is for a context that was used in not the previous event but instead one event before the previous event. The case is further complicated by the fact that writes from core processor 104 to the on chip "context" storage go through the queue 602. Hence for the ABA case, when pre-fetching for the second "A" event, there could be writes in the queue which affect context "A", which could cause the pre-fetch logic to pre-fetch stale values of context "A". In order to avoid this case, the start of a pre-fetch is delayed until all the writes associated with the event one before the current event have cleared the queue 602. The selection of the event to pre-fetch for is also delayed in the same manner. This allows the writes associated with the first event "A", in the "ABA" case, to affect the selection of the second "A" event.

While the invention has been shown and described with respect to preferred embodiments thereof, it will be appreciated by those skilled in the art that various changes in forma and detail can be made without departing from the sprit and scope of the invention. Applicant's invention is limited only by the scope of the appended claims.

We claim:

1. An integrated circuit for processing communication packets, said integrated circuit comprising:
   a core processor configured to execute software to process a series of communication packets, the processing of each packet being an event and having associated data and context information, said core processor having two sets of data registers, each set of data registers being capable of storing the context and data information required to process one packet, said core processor using said sets of registers alternatively; and
   a co-processor having a plurality of data buffers configured to store data and context information associated with a plurality of packets, data and context from one packet being transferred to one of said sets of data registers in said core processor while said core processor is utilizing data and context information stored in a different set of data registers in said core processor, whereby said core processor need not wait between packet processing in order to load data in said registers; and
   means for preventing the occurrence of two back to back events which use the same context data.

2. An integrated circuit for processing communication packets, said integrated circuit comprising:
   a core processor configured to execute software to process a series of communication packets, the processing of each packet being an event and having associated data and context information, said core processor having two sets of data registers, each set of data registers being capable of storing the context and data information required to process one packet, said core processor using said sets of registers alternatively; and
   a co-processor having a plurality of data buffers configured to store data and context information associated with a plurality of packets, data and context from one packet being transferred to one of said sets of data registers in said core processor while said core processor is utilizing data and context information stored in a different set of data registers in said core processor, whereby said core processor need not wait between packet processing in order to load data in said registers; and
   a queue of packets to be processed; and,
   logic configured to detect a first event immediately followed by a second event immediately followed by a third event, said first and third events using the same context data, said logic further configured to delay transferring of the data and context by the co-processor to the core processor for the third event until the data associated with the first event has been emptied from an interface transfer queue.

3. An integrated circuit for processing communication packets, said integrated circuit comprising:
   a core processor configured to execute software to process a series of communication packets, the processing of each packet being an event and having associated data and context information, said core processor having two sets of data registers, each set of data registers being capable of storing the context and data information required to process one packet, said core processor using said sets of registers alternatively; and
   a co-processor having a plurality of data buffers configured to store data and context information associated with a plurality of packets, data and context from one packet being transferred to one of said sets of data registers in said core processor while said core processor is utilizing data and context information stored in a different set of data registers in said core processor, whereby said core processor need not wait between packet processing in order to load data in said registers; and
   a work queue configured to prioritize communication packets for processing, said work queue comprising a detector configured to determine if sequential communications packets queued for transmission to said core processor utilize the same context data, and delay transmission of the second such communication packet until processing of the first such communication packet is complete.

4. A method of processing communication packets in a system which comprises a core processor comprising a first set of registers and a shadow set of registers, the method comprising:
   in said first set of registers and said shadow set of registers, storing context and data necessary to process one communication packet; and
   in a co-processor with a plurality of buffers configured to store data and context information necessary to process a plurality of packets, transferring data and context information associated with a second communication packet from said coprocessor to said shadow set of registers while said core processor is using the data and context information said first set of registers to process a first communication packet, the processing of a packet being an event; and preventing the occurrence of two back to back events which use the same context data.

5. A method of processing communication packets in a system which comprises a core processor comprising a first set of registers and a shadow set of registers, the method comprising:

in said first set of registers and said shadow set of registers, storing context and data necessary to process one communication packet; and in a coprocessor with a plurality of buffers configured to store data and context information necessary to process a plurality of packets, transferring data and context information associated with a second communication packet from said coprocessor to said shadow set of registers while said core processor is using the data and context information said first set of registers to process a first communication packet, the processing of a packet being an event; and wherein said co-processor includes a queue of packets to be processed; and detecting a first event immediately followed by a second event immediately followed by a third event, said first and third events using the same context data, and upon said detecting, delaying the transferring of the data and context by the co-processor to the core processor the third event until the data associated with the first event has been emptied from an interface transfer queue.

6. A system for processing communication packets comprising:

a core processor configured to execute software to process a series of communication packets, the processing of each packet being an event and having associated data and context information, said core processor having two sets of data registers, each set of data registers being capable of storing the context and data information required to process one packet, said core processor using said sets of registers alternatively; and a co-processor having a plurality of data buffers configured to store data and context information associated with a plurality of packets, data and context from one packet being transferred to one of said sets of data registers in said core processor while said core processor is utilizing data and context information stored in a different set of data registers in said core processor, whereby said core processor need not wait between packet processing in order to load data in said registers; and means for preventing the occurrence of two back to back events which use the same context data.

7. A system for processing communication packets comprising:

a core processor configured to execute software to process a series of communication packets, the processing of each packet being an event and having associated data and context information, said core processor having two sets of data registers, each set of data registers being capable of storing the context and data information required to process one packet, said core processor using said sets of registers alternatively; and a co-processor having a plurality of data buffers configured to store data and context information associated with a plurality of packets, data and context from one packet being transferred to one of said sets of data registers in said core processor while said core processor is utilizing data and context information stored in a different set of data registers in said core processor, whereby said core processor need not wait between packet processing in order to load data in said registers; and a queue of packets to be processed; and logic configured to detect a first event immediately followed by a second event immediately followed by a third event, said first and third events using the same context data, said logic further configured to delay transferring of the data and context by the co-processor to the core processor for the third event until the data associated with the first event has been emptied from an interface transfer queue.

* * * * *